United States Patent [19]
McMillen et al.

[11] 3,716,684
[45] Feb. 13, 1973

[54] PORTABLE CIRCUIT BREAKER LEVERING DEVICE FOR METAL-CLAD SWITCHGEAR

[75] Inventors: James W. McMillen; Glenn E. Rhodes, both of Monroeville, Pa.

[73] Assignee: Westinghouse Electric Corporation, Pittsburgh, Pa.

[22] Filed: Dec. 30, 1971

[21] Appl. No.: 214,332

[52] U.S. Cl. ............................ 200/50 AA, 317/103
[51] Int. Cl. ................................................ H01h 9/20
[58] Field of Search ............... 200/50 AA, 50 A, 158; 317/103, 317/99, 112

[56] References Cited

UNITED STATES PATENTS

| | | | |
|---|---|---|---|
| 3,217,211 | 11/1965 | Norden | 317/103 |
| 3,219,771 | 11/1965 | Umphrey | 200/82 B X |
| 3,235,681 | 2/1966 | Polcorny et al | 200/158 X |
| 3,440,371 | 4/1969 | Netzel et al. | 317/103 |
| 3,578,925 | 5/1971 | Drown | 200/50 AA |
| 3,588,398 | 6/1971 | Siviy | 200/50 AA |

Primary Examiner—H. O. Jones
Assistant Examiner—William J. Smith
Attorney—A. T. Stratton et al.

[57] ABSTRACT

Apparatus suitable for placing on the floor or in front of the floor of a metal-clad switchgear cabinet and to be secured to cabinet. The apparatus includes a lightweight portable frame which has an electric motor and a gear reduction transmission mounted thereon to be coupled to the levering-in mechanism of a circuit breaker to be levered into or out of the cabinet. The apparatus may be operated with the cabinet door opened or closed, and it may be operated remotely and automatically. Cooperating limit switches, one of which may be disposed on the switchgear cabinet, and one of which may be disposed on the switchgear cabinet, and one of which may be disposed on the frame, provide control signals to a time delay relay which may be disposed on the frame to actuate the electric motor to an "off" state after the circuit breaker has been completely levered into or levered out of the cabinet.

8 Claims, 7 Drawing Figures

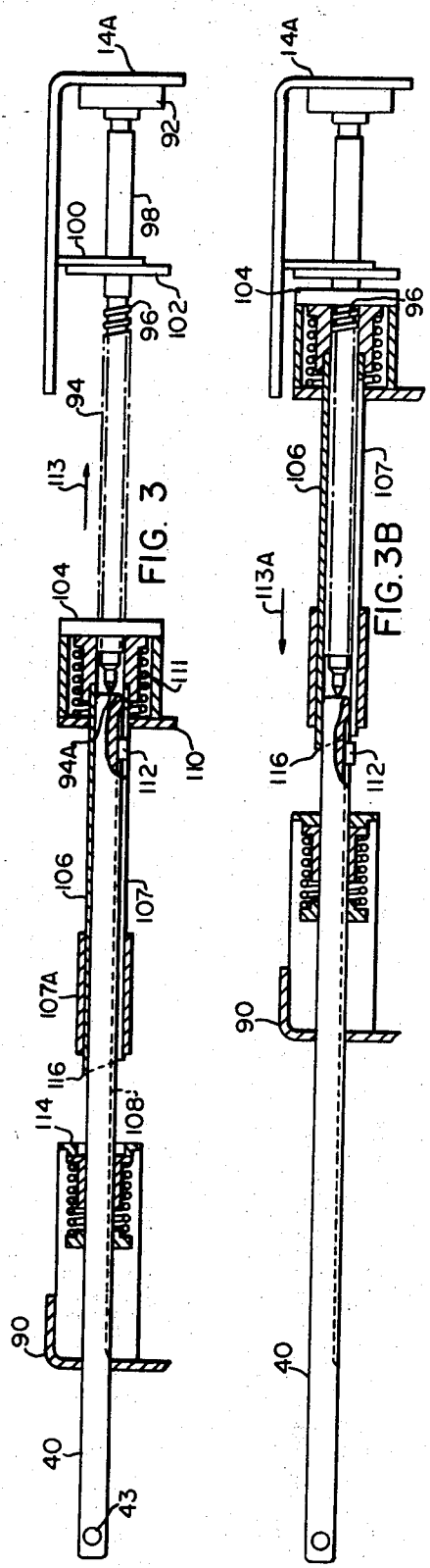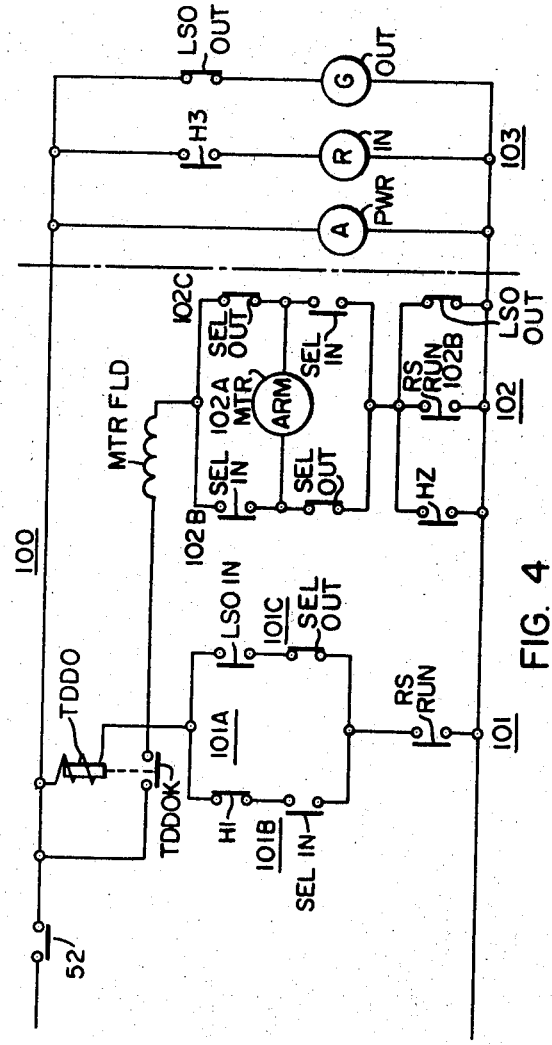

PORTABLE CIRCUIT BREAKER LEVERING DEVICE FOR METAL-CLAD SWITCHGEAR

BACKGROUND OF THE INVENTION

This invention relates to levering mechanisms for drawout circuit breakers in metal-clad switchgear in general, and in particular to automatically controlled, motor-driven levering mechanisms. High voltage, high power circuit breakers are commonly physically large structures mounted on wheels and adapted to be enclosed within a metal cabinet or cell. At the rear of the metal cabinet, the electrical conductor or conductors from the electrical circuit which the circuit breaker is intended to control are provided. The circuit breaker may not properly engage the rear stationary contacts in the associated cell or cabinet structure because of initial improper alignment. In addition, the physical size of the circuit breaker is such that it may not be easily positioned, even though on wheels, within the metal-clad cabinet without the aid of a mechanical device or means, such as a lever or crank. Examples of such levering means may be found in U.S. Pat. Nos. 3,219,771, 3,235,681, 3,440,371 and 3,578,925, the latter of which is assigned to the assignee of the present application. In the previously mentioned patents, the levering mechanism includes a manually operated crank which is attached to a screw mechanism, which may be affixed to the rear of the circuit breaker cabinet. When the crank is turned, the circuit breaker is pulled or actuated along the threads of the screw towards the rear of the circuit breaker cabinet where the primary disconnecting contacts of the circuit breaker and those disposed in the cabinet engage and forced to make good electrical contact. In some instances, a means is provided whereby when the circuit breaker has been completely engaged or completely disengaged from the contacts at the rear of the metal-clad cabinet, the repeated turning of the crank will no longer move the circuit breaker. This is sometimes known as spin free operation. In another kind of levering mechanism, such as disclosed in U.S. Pat. No. 3,030,463 which is assigned to the same assignee as the assignee of the present application, an electric motor is permanently mounted within the switchgear cabinet and adapted to be coupled through a gear reduction means and a clutch mechanism to a levering crank mechanism which may be used to move the circuit breaker to engage or disengage the contacts of the circuit breaker with the stationary contacts at the rear of the metal-clad cabinet. The constructions disclosed in all of the previously mentioned patents have certain disadvantages. The use of a manually operated cranking mechanism or levering mechanism requires the presence of a man for operation. This requires a man close to the point where an injury may occur. In addition, the entire motive force must be supplied by the man even though he is given a mechanical advantage such as a lever or crank. In the case of the motor-drive mechanism, an expensive motor and transmission must be provided for every switchgear cabinet and must remain in place in the cabinet occupying space which could otherwise be occupied by a larger circuit breaker. In addition, if cabinet or housing mounted position sensing means such as microswitches are used, these are required for each cabinet. These sensors are used to indicate the disposition of the circuit breaker within the cabinet so that the levering operation may be stopped before the circuit breaker or the cabinet is damaged. In many instances, the tolerances of these microswitches or various other sensing elements are critical and adjustment is difficult and frequently required. Consequently, it would be advantageous to provide a levering mechanism which would not permanently require space within the circuit breaker cabinet or housing and which would be portable so that the same levering mechanism could be used with a plurality of circuit breakers and their associated cabinets. It would also be advantageous to have a levering mechanism which could be remotely and/or automatically controlled so that a man need not be exposed to the dangers of high voltage potential during a levering-in operation. It would also be advantageous to provide sensing means which did not require critical tolerances for proper operation over a long period of time.

SUMMARY OF THE INVENTION

In accordance with the invention, a portable circuit breaker levering device or means is provided for use within metal-clad switchgear. The levering device includes a motor and a gear reduction box with an output shaft adapted to be connected to the levering shaft of a circuit breaker. The motor and gear reduction transmission are mounted on a frame which contains associated switches and relays to assist in controlling the operation of the levering device. The frame is mounted on skid-like feet and can be positioned onto the metal-clad switchgear. It has clamping means which may be adjusted to secure the frame of the device to a member of the metal cabinet. The levering device is also adapted to be electrically connected to separate, cabinet-mounted switch means, which may indicate in some instances the operating position of the circuit breaker. Another switch is placed on the portable frame to cooperate with the cabinet mounted switch to assist in indicating the position of the circuit breaker within the metal cabinet. Together they cooperate to indicate whether the circuit breaker is completely engaged (levered in) or completely disengaged from the stationary contacts at the rear of the metal cabinet, if the circuit breaker is in an intermediate position, or if the circuit breaker is in the test position (levered out). A connector is provided on the frame of the levering device which is adapted to be connected to an electrical cable which in turn may be connected to a remote control console. The remote control means may include lights which indicate the operating condition or position (described above) of the circuit breaker, and may also have controls for various adjustments of the levering means such as "stop-run" or "in-out" adjustments. It should be noted that the levering mechanism is so constructed as to operate within the metal-clad switchgear cabinet with the door closed or opened and to operate automatically and from a remote control station so as to make the levering operation a relatively safe operation. It should also be noted that the levering device is portable so that it may be transferred from one compartment of a cabinet or housing to another for use on different circuit breakers. In addition, since it is portable, it may be removed from the cabinet after the levering in or levering out operation has been accomplished so that the disclosed invention does not permanently occupy space in the metal-clad switchgear. Another important feature is the fact that a time-delay relay is provided in the electrical control system, which may have a time delay of approximately 8 seconds, for example, so that once a sensor indicates through appropriate control circuitry that the circuit breaker is either completely levered into or completely levered out of the cabinet, the motor may be turned off to prevent further movement of the circuit breaker. Since this time-delay relay means is provided, the tolerances required of the previously mentioned frame mounted and cabinet mounted switches are less critical.

BRIEF DESCRIPTION OF THE DRAWINGS

For a better understanding of the invention, reference may be had to the preferred embodiment exemplary of the invention shown in the accompanying drawings, in which:

FIG. 3A is a view of a typical levering shaft with the associated circuit breaker in the test or disengaged position;

FIG. 3B is a view similar to FIG. 3A with the circuit breaker in the active or engaged position;

FIG. 4 is a schematic diagram of the control circuit including a time-delay relay;

DESCRIPTION OF THE PREFERRED EMBODIMENTS

Figure 1:
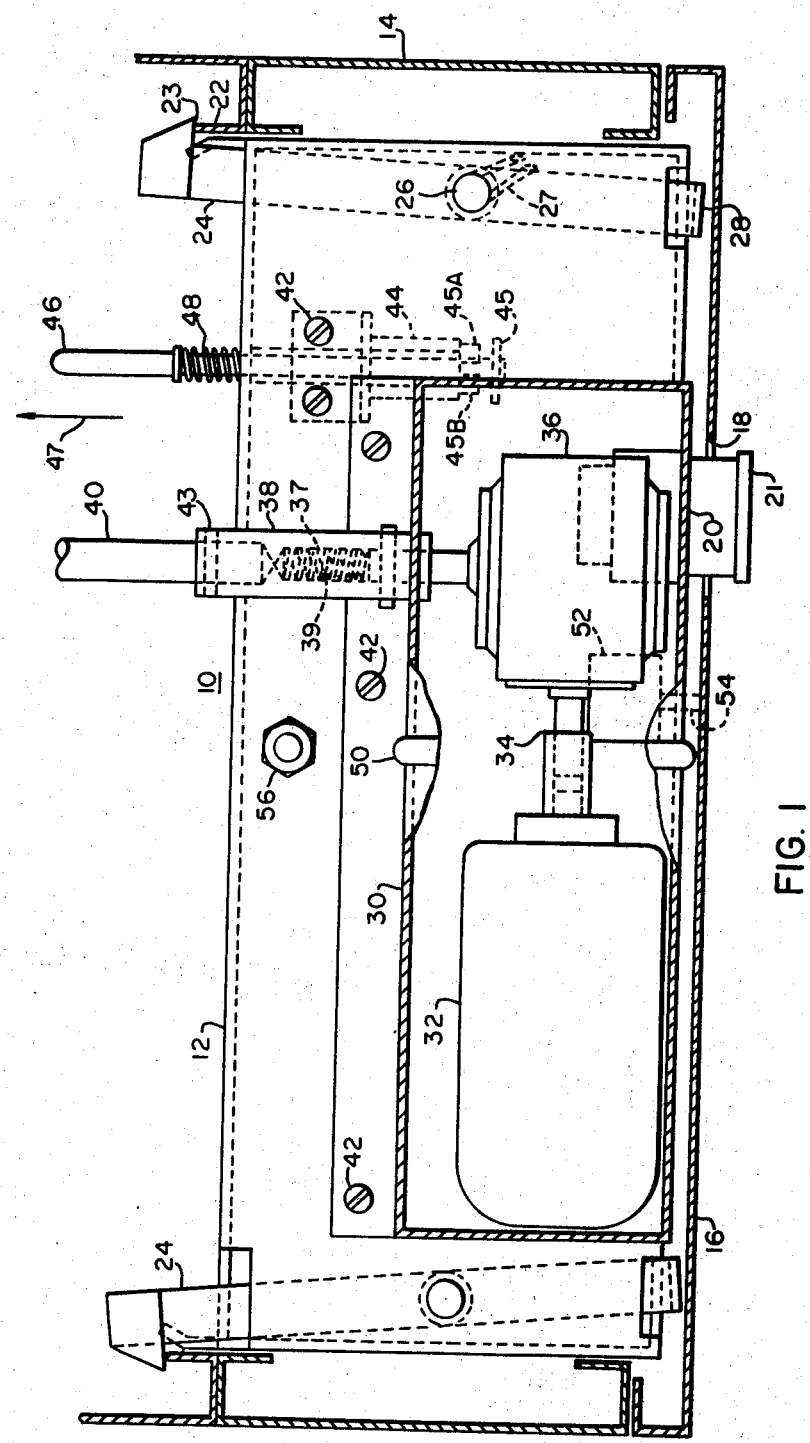
FIG. 1 is a top view of the portable levering device embodying the principal features of the invention.

Referring now to the drawings, and FIG. 1 in particular, a portable circuit breaker levering means 10 is shown. Mechanism 10 includes a substantial frame or support member 12 which may be constructed of an alloy of aluminum or various alloys of steel or other suitable construction material having adequate structural strength. Also shown is a metal-clad switchgear cabinet or housing 14 in which the levering mechanism 10 may be disposed. Reference numeral 16 represents the front door of the cabinet 14 which may be closed during the levering in or levering out operation. Reference numeral 18 represents an opening in door 16 through which a remote control cable (not shown) may be provided to jack 20. Jack or cable connector 20 may have a cover 21. Reference numeral 22 represents a protrusion or projection on the side wall of cabinet 14 which may act simultaneously as a structural brace for the metal side wall of metal-clad switchgear cabinet 14 and as a ridge where a tooth or protrusion 23 on lever 24 may engage a portion of cabinet 14 for the purpose of securing the levering mechanism 10 to the cabinet 14. A similar lever 24 is shown on the left side to accomplish the same purpose. Lever 24 is shown to be spring-loaded by biasing spring 27 around fulcrum or pivot point 26. The other end 28 of lever 24 protrudes through an opening in frame 12 and may be adjusted in a horizontal direction to engage tooth 23 onto ridge or supporting member 22 for the purpose of securing the levering mechanism 10 to cabinet or housing 14. Disposed on top of frame 12 and formed as an integral part of it is a detachable housing 30 which may enclose an electric motor 32 coupled through coupling means an electric motor 32 coupled through coupling means or shaft connecting means 34 to a gear reducing means or reductor 36. The gear reducing means 36 may be so positioned as to change the direction of rotary motion provided by the electric motor 32 from an alignment which is oriented generally parallel to the front of the cabinet 14 and which is parallel to the door 16 to a shaft alignment substantially parallel to the direction of shaft alignment of the circuit breaker during levering in and travel of the circuit breaker during levering in and travel of the levering out thereof. Thus the shaft direction of the levering in mechanism may be displaced 90° from the shaft direction of the electric motor 32. This is indicated by the orientation of coupling 38, which connects the shaft 37 of the gear reducing means 36 to the levering shaft 40. Consequently, the rotary motion of the motor or energy conversion means 32 may be converted by way of the transmission or gear reducing means 36 provide torque in the form of rotary motion to the shaft 37 which torque may be coupled through the coupling means 38 to the shaft 40. Protrusions or pins 43 on the shaft 40 aid in coupling the shaft 40 to the coupling means 38. A spring bias means 39 is provided adjacent to shaft 37 within the coupling means 38 to provide for secure contact between the shaft 37 and the shaft 40. The motor 32 and gear reducing means 36 are enclosed in a housing 30 by suitable fastening means, such as screws 42. Also disposed on frame 12 is a switch 44, the movable contact 45 of which is coupled to a plunger 46 which is spring biased by spring or resilient member 48. Consequently, if the plunger 46 is caused to move in the direction 47, contact 45 may engage stationary contacts 45A and 45B in switch 44. Switch 44 is secured to frame 12 by suitable means, such as bolts or fastening means 42. A handle, or positioning means 50, is provided on the portable levering means 10 to assist in initially positioning the portable levering means 10 within cell 14. A switch 52 is provided having a movable plunger 54 which faces frontwardly with respect to cell 14 so that the closing of door 16 may actuate plunger 54 to a position to cause switch 52 to provide appropriate control signals to the various control means to indicate that the front door has been closed and to therefore permit the energizing or actuation of various relays and circuits in the control means. A nut or grommet 56 is provided through which a cable (not shown) may be fed or supplied to various elements within the frame 12 at one end to a connector at the other end for engagement with a complementary connection on cabinet 14 (not shown).

Figure 2:
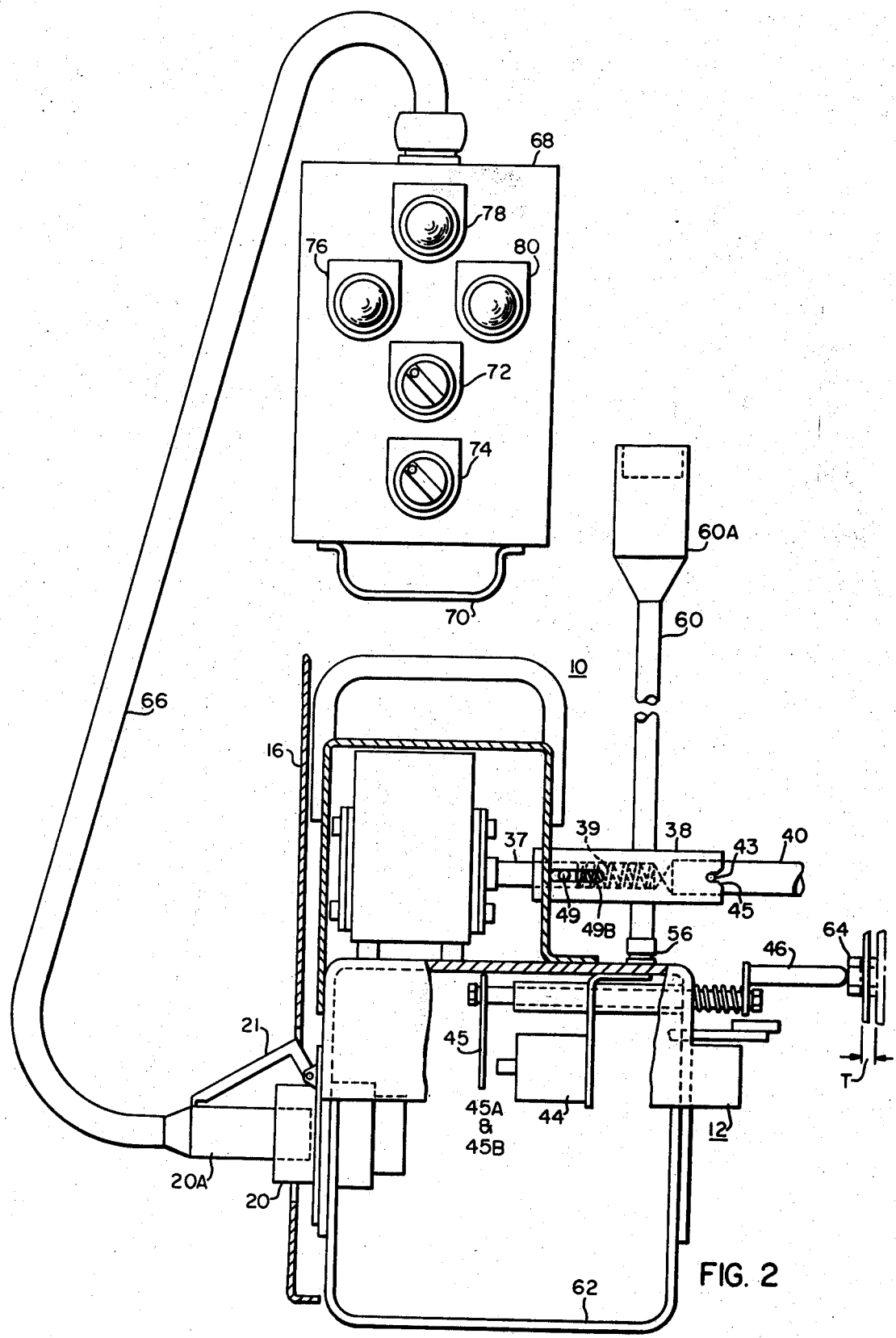
FIG. 2 is a side view of the portable levering device shown in FIG. 1 including remote control panel and cabinet connecting plug.

Referring now to FIG. 2, a side view of the apparatus shown in FIG. 1 is shown. Connector or jack 20 is shown with cover 21 in its raised or open position, so that plug 20A may be fed through the opening in door 16 to the connector or jack 20. The other end of connector 20A is connected through cable 66 to a remotely located control box or console 68. A lead 60, which was not shown in FIG. 1, is shown connected at one end to grommet 56 and at the other end to a connector 60A, which may be connected to a corresponding complementary connector (not shown) on the circuit breaker cabinet 14. A nut or abutting member 64 is shown positioned closely to plunger 46. This abutting member of nut 64 may be positioned on the circuit breaker so that if the circuit breaker travels a distance T, the plunger 46 may move sufficiently to cause contact 45 to close or engage contacts 45A and 45B to cause various circuit functions to occur. It will be noted that there is a restraining pin 49 on shaft 37 which may move freely within slot 49B in sleeve or coupling 38 in response to the tension of the spring 39 when cooperating with the levering shaft 40. This provides resilience or flexibility in the connections between shafts 40 and 37. Remote control panel 68 may have a handle 70 for ease in handling control panel 68. It may also have control switch 72 which may be an "in-out" switch for controlling the direction of levering of the circuit breaker, and a switch 74 which may be a "stop-run" switch for controlling power to the motor 32. In addition, indicator lights, such as 76, 78 and 80, may be provided to indicate the status of the circuit breaker. For example, lamp 78, which may for example be amber, may indicate the presence of electrical power at the apparatus 10. Lamps 76 and 80, which may be "out" and "in" lamps, respectively, and which may be for example green and red lamps, respectively, may be used to indicate the relative position of the circuit breaker being controlled by the apparatus 10. For example, if the circuit breaker is fully out, lamp 76 may illuminate green, and if the circuit breaker is fully engaged, lamp or illuminating means 80 may illuminate red. If neither lamp is illuminated, and power has been applied, it can be presumed that the circuit breaker is in an intermediate position between fully out and fully in positions.

Referring now to FIG. 3A, a levering shaft system is shown. Portions of the circuit breaker cabinet and the circuit breaker are also shown. The apparatus shown in FIG. 3A is not part of the instant invention but a description of its operation will be helpful in understanding how the invention in the present application operates. The levering mechanism shown in FIG. 3A comprises a levering in shaft 40. Levering shaft 40 has already been described. A portion of circuit breaker enclosure or cell 14A is shown at the far right of FIG. 3A. A bearing means 92 abuts and is attached to the inner surface of wall 14A. This bearing surface supports one end of a partially threaded shaft or screw 94. The threaded portion is shown as 96 and the unthreaded portion is shown as 98. Two brackets or support members 100 and 102 are shown adjacent to unthreaded section 98 of the threaded shaft 94. A spring loaded nut means 104, which bridges or encloses a portion of both the levering shaft 40 and the screw means 94, is shown in FIG. 3A. Nut means 104 is adapted to turn on the threaded section 96 of the screw means 94; however, at one end the nut means is rigidly attached or welded to a guide tube 106 having a guide tube keyway 107 cut longitudinally into it. Guide tube 106 has a supporting means 107A at one end to reinforce the slotted guide tube 106. The levering shaft 43 also has a slot 108 machined or otherwise placed in it which may be useful for other purposes. At one end of levering shaft 43 and in the keyway 108 is disposed a key 112 which is rigidly affixed in the keyway 108 such as by welding. This key 112 may traverse the guide tube keyway 107 as the levering shaft is rotated causing nut 104 to move longitudinally in the direction of arrow 113. A similar nut arrangement 114 is shown in position to traverse levering shaft 40. Portions of the circuit breaker to be levered are shown at 90 and 110 in FIG. 3A. It will be noted that nut 104 abuts wall section 110 of the circuit breaker, partially due to the force of the spring 111.

In operation, as the levering shaft 40 is rotated in a clockwise direction, such as by portable levering means 10, the nut 104 travels toward bearings 92 along the threaded section 96 of member 94 until the key 112 is no longer engaged by the keyway 107 of the guide tube 106, as will be the case when end 116 moves past key 112. In this case, nut 104 will no longer be forced to move in direction 113 toward bearing means 92 even though shaft 40 continues to "spin free" or rotate. This represents the fully engaged circuit breaker position.

Referring now to FIG. 3B, the circuit breaker is shown in the fully engaged position as indicated by the key 112 which no longer engages guide tube slot 107 at end 116. To withdraw the circuit breaker, the levering shaft 40 is rotated in the opposite direction, which may for example be the counterclockwise direction, in which case the key 112 will make contact with a certain portion of end 116 of guide tube 106. Nut 104 will be forced to move along threaded section 96 in the direction 113A until it reaches a position where the contacts on the circuit breaker (not shown) no longer engage the stationary contacts in the rear of the circuit breaker cabinet 14A. This fully withdrawn position is shown in FIG. 3A.

Referring now to FIG. 4, an electric levering mechanism schematic diagram or circuit 100 is shown. Circuit 100 may be energized by either an alternating current or a direct current source of power as indicated at the conductors L1 and L2. A starter switch such as 52, including a heatable or bimetal element and contact, is shown connected in series circuit relationship with the previously mentioned power source. In addition, there are three main parallel branch circuits 101, 102 and 103 connected in circuit relationship with the power source. The first of these 101 comprises a time-delay relay coil TDDO. Connected in series circuit relationship with coil TDDO is the parallel combination 101A of two sets of relay contacts connected in series circuit relationship. In the first branch 101B of the parallel circuit 101A are normally closed cabinet-mounted switch contacts H1 and normally open contacts designated SEL IN. In the second branch 101C of the parallel circuit 101A are normally opened limit switch contacts designated LSO IN and normally closed selector contacts designated SEL OUT. The parallel combination 101A is in series circuit relationship with the normally open "run" contacts designated RS RUN of the "run-stop" switch 74 as indicated in FIG. 2.

The second parallel branch circuit 102 includes the normally opened contacts TDDOK of the TDDO relay coil. In addition, in series circuit relationship with contacts TDDOK relay contacts is the parallel circuit combination 102A comprising two series circuits, 102B and 102C, the first of which 102B comprises a branch circuit including a normally opened contact designated SEL IN and a normally closed contact indicated SEL OUT. In the other parallel branch 102C is a normally closed contact designated SEL OUT and a normally closed contact designated SEL IN in that order relative to branch 102B. Therefore the contacts in branches 102B and 102C though equal are disposed oppositely in each branch. The motor armature winding designated MTR ARM of motor 32, the field of which MTR FLD was described previously, has leads which interconnect between the SEL IN and the SEL OUT contacts of the previously mentioned branch circuits 102B and 102C. Circuit combination 102A is connected in series circuit relationship with a parallel circuit combination 102D including three elements. The three elements in this parallel combination are normally open cabinet-mounted switch contacts H2, normally opened run-stop contacts in the run mode and designated RS RUN and the normally closed limit switch out contact designated LSO OUT.

The third parallel branch of circuit 100 is the lamp circuit 103. This circuit includes three branches. The first branch comprises an amber lamp indicated as the power lamp 78 in FIG. 2 designated PWR in FIG. 4. The second branch comprises the red lamp R designated the IN lamp 80 in FIG. 2, which is connected in series circuit relationship with normally open cabinet-mounted switch contacts H3. The third branch comprises a green lamp G designated the OUT lamp 72 in FIG. 2 which is connected in series circuit relationship with normally closed limit switch out contacts LSO OUT.

Referring now to FIGS. 1, 2, 3A, 3B and 4, the operation of the control circuit 100, the "spin free" levering mechanism and portable levering device 10 will now be described. Assuming that the circuit breaker is to be levered or actuated to a fully engaged or energized position, that is, to a position where the contacts of the circuit breaker are in direct intimate contact with the stationary contacts at the rear of the circuit breaker cell 14, the circuit breaker's disposition with respect to the rear wall of the cell 14A and the levering shaft 40 is as shown in FIG. 3A. When the levering device 10 is placed on the floor of the cell 14, and the door 16 closed after the levers 24 have been positioned against the support member 22, the levering device is in readiness for operation provided the jack 20A has been connected to the connector 20 and jack 60A has been connected to a suitable complementary jack in the cell 14. The closed door 16 will abut against plunger 54, activating switch 52 to energize the circuit 100. The limit switch out contact LSO OUT is closed and the green light G is illuminated. The amber light A is illuminated to show power is available at the levering device 10, the red light R is not illuminated because the cabinet-mounted switch contacts H3 on the circuit breaker cell 14 are not closed. By placing switch 72 in the IN position and moving switch 74 to the RUN position, electrical current may flow through the TDDO relay coil, through the normally closed cabinet-mounted switch contacts H1 through the closed selector in contacts SEL IN and the closed RS RUN contacts to energize the relay coil TDDO. Such being the case, the contacts TDDOK are closed providing energy to the motor field MTR FLD. This current is also directed through the motor armature MTR ARM and the closed contacts SEL IN and returned to the power source through the closed RS RUN contacts. As motor 32 is energized to turn the gear reducing means 36, shaft 37 may rotate causing levering shaft 40 which is connected at coupling 38 to the shaft 37 to rotate in the clockwise direction and in turn causing the nut 104 and the attached circuit breaker to advance towards the rear of cell 14A. After a short span of travel in this direction, plunger 46 will be disengaged from the moving circuit breaker as the circuit breaker traverses the distance T shown in FIG. 2. The limit switch out contacts LSO OUT which are normally closed will open and the limit switch in LSO IN contacts which are normally opened will close. The opening of the limit switch out contacts LSO OUT causes the green light G to extinguish. Consequently, in this intermediate position between the completely out or test position and the completely engaged or energized position, only the amber light A is illuminated. The levering nut 104 will continue to turn as long as switch 74 is maintained in the "run" mode and the circuit breaker will be drawn towards the rear of cabinet 14A and eventually contact will be made between the main contacts of the circuit breaker and the power contacts (not shown) provided at the rear of cabinet 14A. Immediately before the circuit breaker has been fully engaged as has been previously described, a simple cabinet-mounted switch H which may be disposed at the rear of cabinet 14 or 14A will be actuated, opening the normally closed contacts H1 and closing the normally open contacts H3. The red light 80 or R will illuminate on panel 68 and the time-delay relay coil TDDO will be deenergized.

In one embodiment of the invention, the delay between the time that the relay coil TDDO is deenergized and its contacts TDDOK are opened may be 8 seconds. As a general proposition, the contacts TDDOK may close immediately upon energization of the coil TDDO, but will open only some time after the same coil TDDO is deenergized. Such being the case, power is removed from the motor field MTR FLD and motor armature MTR ARM of motor 32 and the levering shaft 40 is stopped from further rotating. In the event this occurs after the main contacts of the circuit breaker have fully engaged, the spin-free mechanism shown in FIGS. 3A and 3B will nevertheless prevent the rotating shaft 40 from driving the circuit breaker any farther into the cell 14. This is accomplished by the fact that the key 112 which is locked or welded to the guide tube 106 becomes disengaged with respect to the guide tube keyway 107 as the nut 104 moves a predetermined distance. Nevertheless, it is contemplated that the time-delay relay will be deenergized upon the actuation of the cabinet-mounted switch H and the levering shaft 40 will stop rotating a short time later. At this point the circuit breaker contacts are completely engaged within metal-clad cell 14 as indicated by FIG. 3B.

The levering means may also be used to disengage the primary disconnecting contacts of the circuit breaker to the position shown in FIG. 3A. This is done by changing the direction of the current flowing in motor armature MTR ARM of motor 32, thus changing the direction of rotation of the shaft 37 of the gear reducer to a counterclockwise rotation which will cause the nut 104 to move in direction 113A as shown in FIG. 3B. Assuming that power has been applied and the circuit breaker has been properly positioned as was previously described, the switch 72 shown on console 68 may be actuated to the "out" position and the stop-run button 74 may be actuated to the "run" position. The instant immediately after the power is applied, the amber light A will illuminate, the now closed contacts H3 will cause the red light R to illuminate and the now opened limit switch out contacts LSO OUT will prevent the green light G from being illuminated. The selector out contacts SEL OUT are in series circuit relationship with the motor armature MTR ARM and are closed and the selector in contacts SEL IN are opened. The limit switch in contacts LSO IN which were normally opened, are now closed; therefore, when the run-stop switch 74 is actuated to the run position, power in the form of electrical current will flow through the time-delay relay coil TDDO through the now closed limit switch in contacts LSO IN through the selector out contacts SEL OUT and through the closed run-stop switch contact RS RUN and return to the power source. Immediately upon energization of the coil TDDO by electrical current flowing through the three last-mentioned contacts, all in branch circuit 101, the contacts TDDOK will close and current will be applied to the motor field MTR FLD through one set of closed selector out contacts SEL OUT through the motor armature MTR ARM in an opposite direction than that of the levering in operation or process, through another set of closed selector out contacts SEL OUT and through the closed run-stop contacts RS RUN. The later contacts being in branch circuit 102. A short time after the levering out process has begun, the simple cabinet-mounted switch H on the switchgear cell will be de-actuated and the closed H3 contacts will open, and the red light R will be extinguished. The circuit breaker will move outwardly towards the position shown in FIG. 3A as the motor 32 continues to rotate through the intermediate positions of the circuit breaker between fully engaged or energized and fully disengaged or deenergized. When the circuit breaker has been caused or actuated to travel as far to the front of the cabinet 14 as is possible on screw 96, the nut 104 will disengage from screw section 96 of shaft 94 and spin freely, thus stopping the motion of the circuit breaker 90 in direction 113A. Just prior to this time, the plunger 46 will be depressed by the operating position of the circuit breaker in the cell and the limit switch contacts LSO will change modes. Such being the case, the green light 76 will illuminate and power will be removed from the coil of the relay TDDO thus deenergizing the coil. A short time later, approximately 8 seconds in one embodiment of the invention, the relay contacts TDDOK will open, thus removing power from the motor field MTR FLD and the armature MTR ARM of the motor 32. At this point, the circuit breaker is in the position shown in FIG. 3A and the high power primary disconnecting contacts at the rear of the circuit breaker have been disengaged from the power line or stationary disconnecting contacts in the rear of cabinet 14. Door 16 may then be opened and the circuit breaker may be removed for any purpose, at which time the portable circuit breaker levering means may be disengaged and removed from the cabinet 14 and positioned in another cabinet for subsequent levering in or levering out of other circuit breakers.

Figure 5:
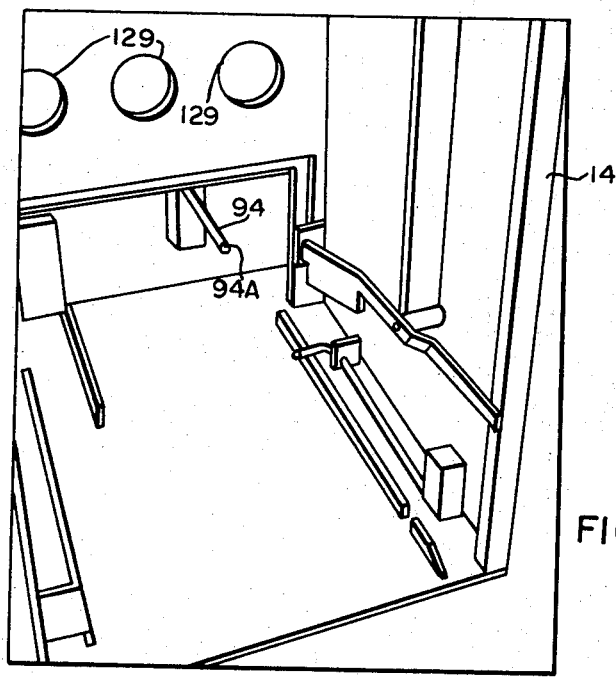
FIG. 5 is a view of a typical metal-clad switchgear enclosure including a threaded levering screw, which may be adapted for use with the invention.

Referring now to FIG. 5, a view of a circuit breaker enclosure 14 with the associated circuit breaker removed is shown including the threaded levering screw 94 of shaft 96. It is the end 94A of this threaded shaft 94 which initially engages nut 104 during the levering in operation.

Figure 6:
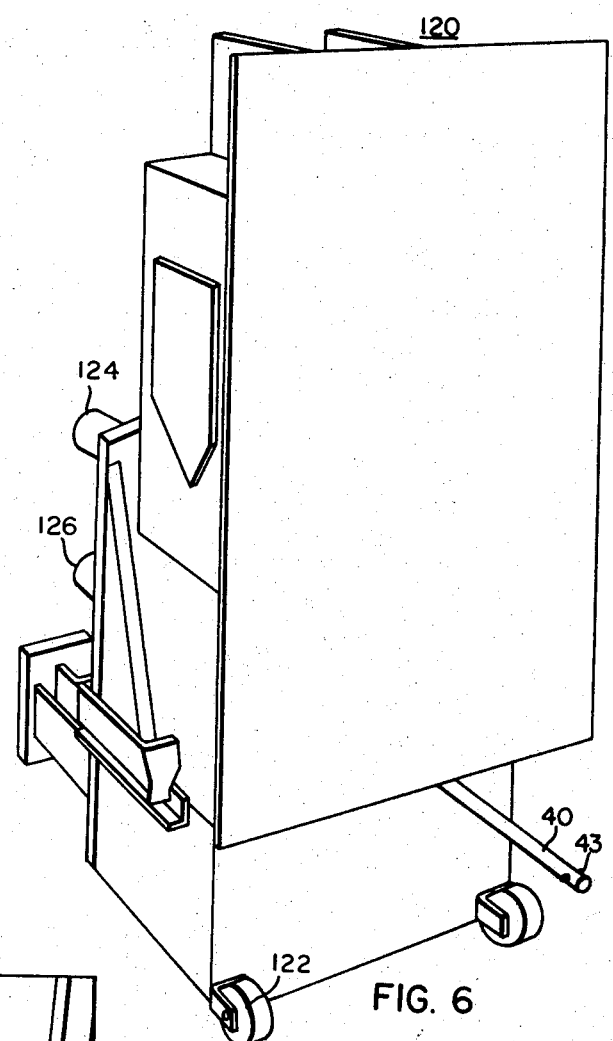
FIG. 6 shows a view of a typical circuit breaker including a levering shaft.

Referring now to FIG. 6, a circuit breaker 120, parts of which may be indicated by 90 and 110 in FIG. 3A and FIG. 3B, is shown. The levering shaft 40 is shown projecting from the front of circuit breaker 120, and it is on this levering shaft that the connecting or coupling means 38 is engaged with protrusion 43 to allow subsequent rotation of shaft 43 in either clockwise or counterclockwise direction for levering in or levering out of the circuit breaker 120. It will be noted that the circuit breaker is mounted on wheels 122 which may be positioned in the metal-clad cabinet for alignment of primary disconnecting contacts for alignment of primary disconnecting contacts 124 and 126, which may be the finger-type variety and which may engage main stationary contacts in the rear of cabinet 14 through holes such as 129 shown in FIG. 5.

One of the important features of this invention is the use of the contacts H2 and LSO OUT as shown in branch circuit 102D of FIG. 4 in cooperation with the time delay relay TDDO. It is undesirable to stop the movement of the circuit breaker as it almost reaches the fully in or fully out position. Consequently once the run stop switch is actuated in a levering operation if the circuit breaker is almost in the fully in or fully out position one of the contacts H2 or LSO OUT in circuit 102D will shunt the contacts of the run stop switch RS RUN so that even if run-stop switch is placed in the stop mode current will continue to flow through the motor field MTR FLD and armature MTR ARM because the TDDOK contact will not reopen even after deenergization of coil TDDO until after a time delay sufficient to allow the circuit breaker to fully engage the primary disconnecting contacts or to come to rest in the fully out position.

It is to be understood that the inventions embodied in this application may also be used for levering switchgear devices other than circuit breakers such as other types of circuit interrupters including fused switches. It is also to be understood that the direction of rotation of the shafts 34 or 37 for levering in and levering out need not be as described. It is also to be understood that the latching means 24 shown in FIG. 1 need not be the exclusive or only means for securing the portable levering means to the metal-clad cabinet 14. It is also to be understood that the motor and transmission system may be aligned such that the motor and transmission system may be aligned such that the axial position of the shaft of the motor and the output shaft of the gear reducing system are parallel rather than at 90° as shown in FIG. 1. It is also to be understood that the operation of the levering means 10 need not be confined to a remote operation, but may be done locally if desirable. In some instances, if desirable, the door 16 may be left open and a mechanical or electrical override provided to switch 52 so that the control system for the portable levering device may be properly energized with the door open.

The apparatus embodying the teachings of this invention has many advantages. For example, a single portable levering device may be used to lever many different circuit breakers in and out of position in different cells of a switchgear line-up including a plurality of cells. Another advantage lies in the fact that the levering in device may be operated remotely so that the circuit breaker may be more safely levered into the energized position and levered out or moved out of the energized position from the safe position. Another advantage of the invention lies in the fact that the apparatus and means for levering the circuit breaker need not be permanently stored or disposed within the metal-clad switchgear where it will occupy space that could be put to better use in containing associated switchgear equipment or a larger circuit breaker. Another advantage lies in the fact that the time-delay relay allows for non-critical tolerances in the limit switches such as switch 44 which is mounted on the circuit breaker levering device 10. What has been referred to as the cabinet-mounted H switch may be an integral part of each cell or may be disposed on the portable levering mechanism. Another advantage lies in the fact that the portable levering device is adapted to be used in known circuit breaker apparatus. Another advantage lies in the fact that the circuit breaker door may be closed during the levering in and levering out process. Still another advantage lies in the fact that the power of an electrical motor may be used to lever the circuit breaker in and out in place of the power of a man using a manual means for levering. Another advantage lies in the ease of operation and maintenance of the levering device which is indirectly due to its portability, that is, the levering in device may be removed from the constricted area of a circuit breaker and placed on a workbench for easy troubleshooting and replacement of parts; or as seen in another way, should one portable levering device fail, another may be used to replace it in any of the operations for which the first one was used. A very important feature which is related to this lies in the fact that a motor levering mechanism which is installed directly in one metal-clad switchgear cell and which fails while the circuit breaker is in the engaged position may require the performance of maintenance functions by maintenance personnel in the same metal-clad cell as the live contacts which may be at the rear of the cell. The alternative to this would be to operate a disconnect switch or circuit breaker elsewhere so that power would not be provided to the rear of the cell, but this requires extra effort on the part of the maintenance personnel and may cause other cells to be deenergized concurrently.

What we claim as our invention:

1. A portable switchgear circuit interrupter levering means comprising:
    a portable support member adapted to be disposed inside a protective cabinet for switchgear means;
    attaching means disposed on said support member for securing said portable support member to a portion of said protective cabinet;
    energy conversion means disposed on said support member to provide a force to said switchgear to actuate the movement of said circuit interrupter within said protective cabinet;
    sensor means to sense the position of said switchgear means in said cabinet;
    indicator means which cooperate with said sensor means to indicate the position of said circuit interrupter in said cabinet; and
    control means to control said energy conversion means.

2. The combination as claimed in claim 1 wherein; said circuit interrupter comprises a circuit breaker; said attaching means comprise two levers each having a fulcrum pivot means and a capturing lip on one end, said levers being disposed generally horizontally and generally in a front-to-rear orientation with respect to said frame and upon said frame at said pivot means, said levers being adapted to be pivoted in a horizontal plane in opposite directions from within the frame to engage vertical protrusions on either side of the inside portion of the side walls of said protective cabinet, said energy conversion means comprising an electric motor adapted to be controlled by said control means, a transmission means adapted to be connected to said motor to transform the energy of the rotary motion of said motor at a first predetermined speed to the energy of rotary motion at a second predetermined speed at an output chuck, said output chuck being adapted to engage a complementary levering means on said switchgear means to displace said switchgear means in either direction in a front-to-rear path in said protective cabinet.

3. The combination as claimed in claim 2 wherein said motor aligned in a direction generally transverse to the said direction of said front-to-rear path of said circuit interrupter, said transmission means comprising a gear reduction means adapted to change the axial direction of the rotary energy provided by said motor generally 90° in a horizontal plane to provide said output rotating energy to said levering means through said output chuck.

4. The combination as claimed in claim 1 including skids upon which the supporting frame is supported.

5. The combination as claimed in claim 3 including skids upon which the supporting frame is supported.

6. The combination as claimed in claim 1 wherein said sensor means comprises a first switch with an extended actuating member, which first switch is actuated by movement of said circuit interrupter in a front-to-rear path with respect to said support member.

7. The combination as claimed in claim 6 wherein said circuit interrupter comprises a circuit breaker, said attaching means comprise two levers each having a fulcrum pivot means and a capturing lip on one end, said levers being disposed generally horizontally and generally in a front-to-rear orientation with respect to said frame and upon said frame at said pivot means, said levers being adapted to be pivoted in a horizontal plane in opposite directions from within the frame to engage vertical protrusions on either side of the inside of the side walls on said protective enclosure, said energy conversion means comprising an electric motor adapted to be controlled by said control means, a transmission means including an output chuck and being adapted to be connected to said motor to transform the energy of the rotary motion of said motor at a first predetermined speed to the energy of rotary motion at a second predetermined speed at said output chuck, said output chuck being adapted to engage a complementary levering device on said switchgear means to displace said switchgear means in either direction in a front-to-rear path in said protective enclosure.

8. The combination as claimed in claim 3 wherein said sensor means provides a motor actuating switch, said control means comprise time delayed relay contacts which cooperate with said sensor means once said motor actuating switch has been actuated in a levering operation to automatically maintain said motor in motion when said circuit breaker contacts are in a state of advanced partial engagement with contacts on the rear of said cabinet to move said circuit breaker until said state of advanced partial engagement ceases, and to also maintain said motor in motion when said circuit breaker is disposed between its greatest distance from said rear contacts while in contact with said levering means and a predetermined distance less than said greatest distance from said contacts.

* * * * *